(12) United States Patent
Kobayashi et al.

(10) Patent No.: US 11,225,708 B2
(45) Date of Patent: Jan. 18, 2022

(54) PLASMA SPRAYING DEVICE AND METHOD FOR MANUFACTURING BATTERY ELECTRODE

(71) Applicant: Tokyo Electron Limited, Tokyo (JP)

(72) Inventors: Yoshiyuki Kobayashi, Miyagi (JP); Naoki Yoshii, Tokyo (JP); Katsuji Kadosawa, Yamanashi (JP); Kimitomo Kaji, Tokyo (JP)

(73) Assignee: Tokyo Electron Limited, Tokyo (JP)

( * ) Notice: Subject to any disclaimer, the term of this patent is extended or adjusted under 35 U.S.C. 154(b) by 347 days.

(21) Appl. No.: 16/467,281

(22) PCT Filed: Dec. 7, 2017

(86) PCT No.: PCT/JP2017/044051
§ 371 (c)(1),
(2) Date: Jun. 6, 2019

(87) PCT Pub. No.: WO2018/105700
PCT Pub. Date: Jun. 14, 2018

(65) Prior Publication Data
US 2020/0071810 A1  Mar. 5, 2020

(30) Foreign Application Priority Data

Dec. 8, 2016 (JP) .............................. JP2016-238707

(51) Int. Cl.
*H01M 4/04* (2006.01)
*C23C 4/134* (2016.01)
(Continued)

(52) U.S. Cl.
CPC ................ *C23C 4/134* (2016.01); *C23C 4/08* (2013.01); *H01G 11/86* (2013.01);
(Continued)

(58) Field of Classification Search
None
See application file for complete search history.

(56) References Cited

U.S. PATENT DOCUMENTS

2015/0162596 A1\* 6/2015 Dadheech ........... H01M 10/052
429/231.95

FOREIGN PATENT DOCUMENTS

| JP | S60-25166 | 2/1985 |
| JP | H05-009700 | 1/1993 |

(Continued)

OTHER PUBLICATIONS

Bin Xiang et al., Electromechanical Probing of Li/Li2Co3 Core/Shell Particles in a TEM, Journal of Electrochemical Society, 2013, vol. 160, Issue 3, pp. A415-A419.

*Primary Examiner* — Wyatt P McConnell
(74) *Attorney, Agent, or Firm* — IPUSA, PLLC

(57) ABSTRACT

There is provision of a plasma spraying device including a supplying section configured to convey feedstock powder with a plasma generating gas, and to inject the feedstock powder and the plasma generating gas from an opening of a tip; a plasma generating section configured to generate a plasma by decomposing the injected plasma generating gas using electric power of 500 W to 10 kW; and a chamber causing the supplying section and the plasma generating section to be an enclosed region, which is configured to deposit the feedstock powder on a workpiece by melting the feedstock powder by the plasma generated in the enclosed region. The feedstock powder is any one of lithium (Li), aluminum (Al), copper (Cu), silver (Ag), and gold (Au). A particle diameter of the feedstock powder is between 1 μm and 50 μm.

5 Claims, 10 Drawing Sheets

(51) Int. Cl.
 *C23C 4/08* (2016.01)
 *H01G 11/86* (2013.01)
 *H01M 4/1395* (2010.01)
 *H05H 1/34* (2006.01)
 *H05H 1/42* (2006.01)

(52) U.S. Cl.
 CPC ....... *H01M 4/0419* (2013.01); *H01M 4/1395* (2013.01); *H05H 1/34* (2013.01); *H05H 1/42* (2013.01)

(56) References Cited

FOREIGN PATENT DOCUMENTS

| | | |
|---|---|---|
| JP | H06-325895 | 11/1994 |
| JP | H07-54122 | 2/1995 |
| JP | H07-100158 | 4/1995 |
| JP | H08-199372 | 8/1996 |
| JP | H08-225916 | 9/1996 |
| JP | 2002-231498 | 8/2002 |
| JP | 2014-123663 | 7/2014 |
| JP | 2015-105196 | 6/2015 |
| JP | 5799153 | 10/2015 |
| JP | 2018-078054 | 5/2018 |

* cited by examiner

FIG.2
(a) Li POWDER IS SUPPLIED FROM OUTSIDE
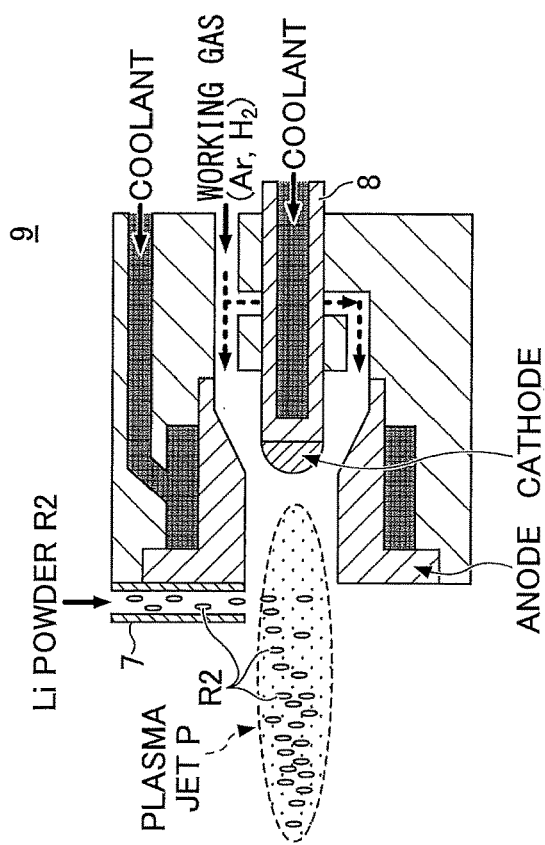
(b) Li POWDER IS SUPPLIED FROM AXIS
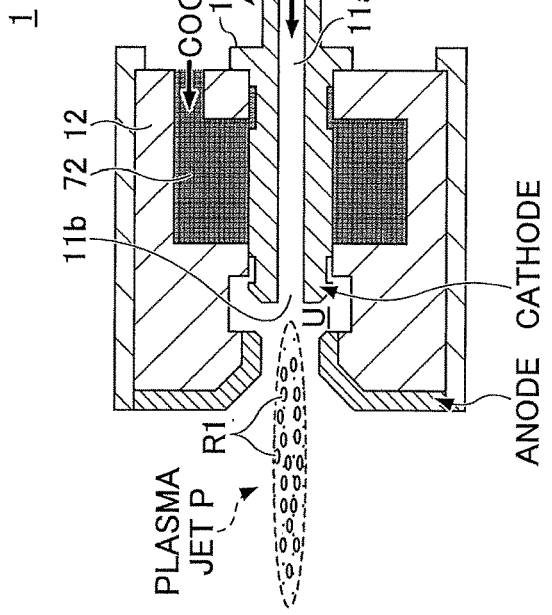

FIG.4
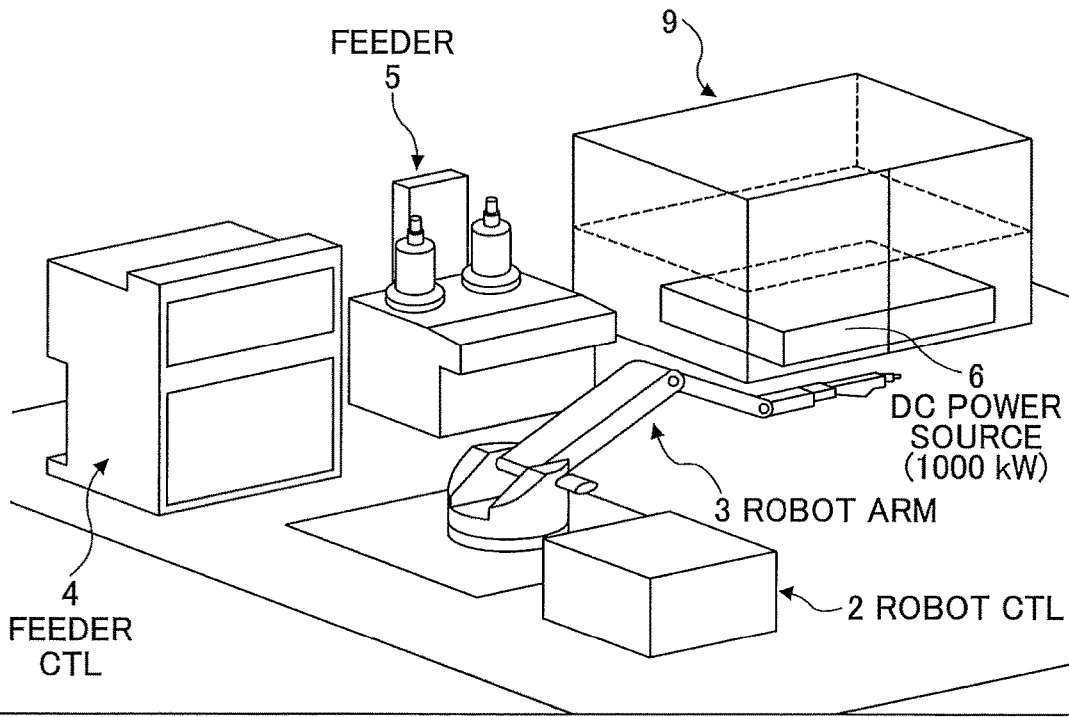
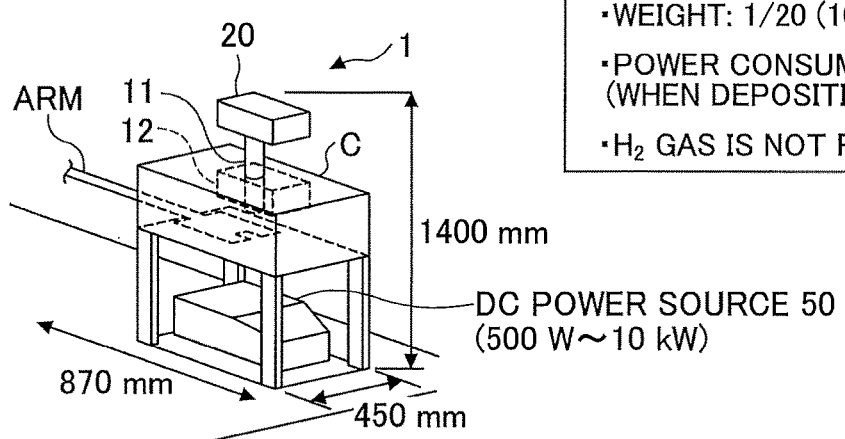

FIG.5
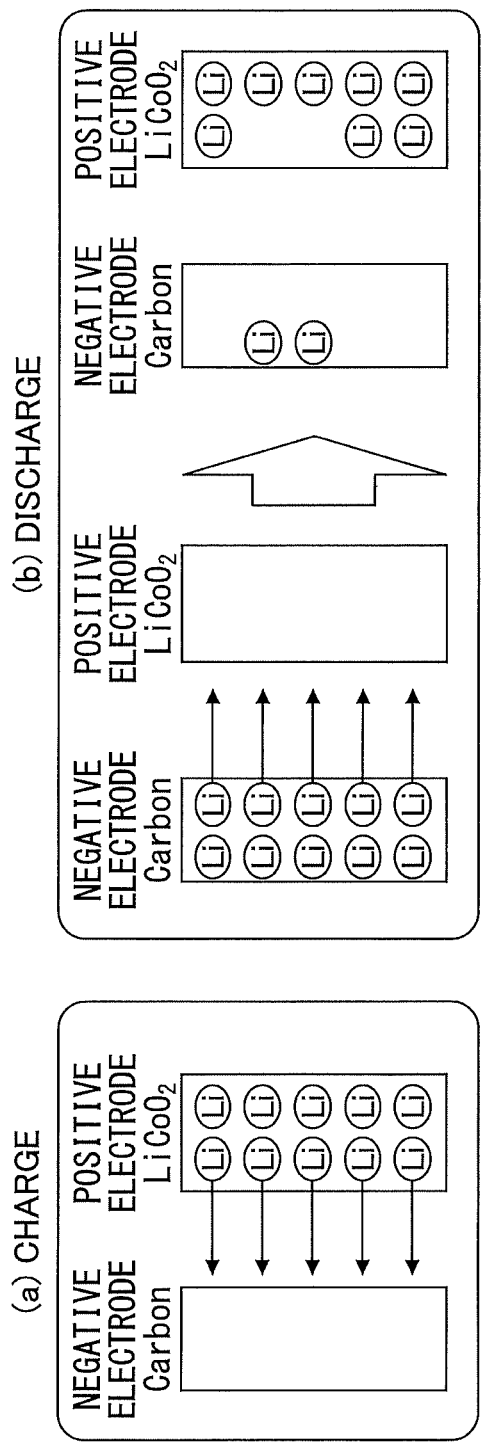
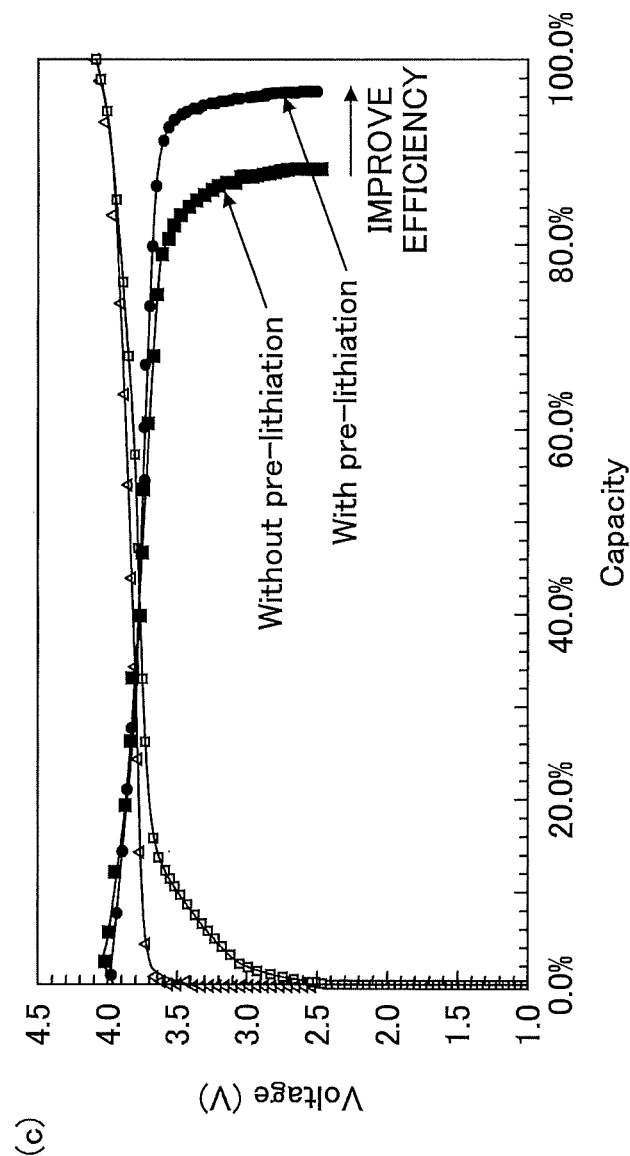

FIG.6
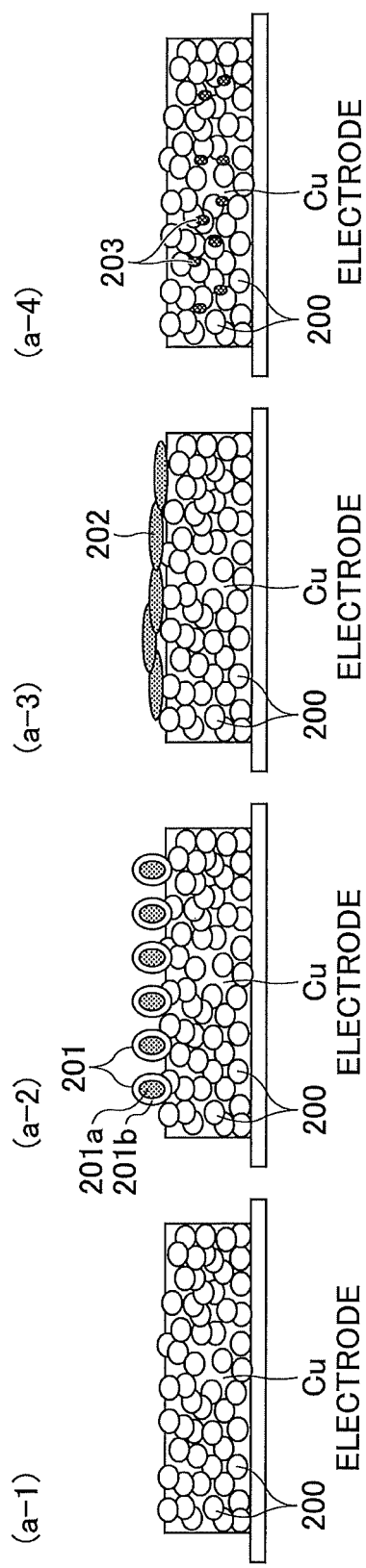
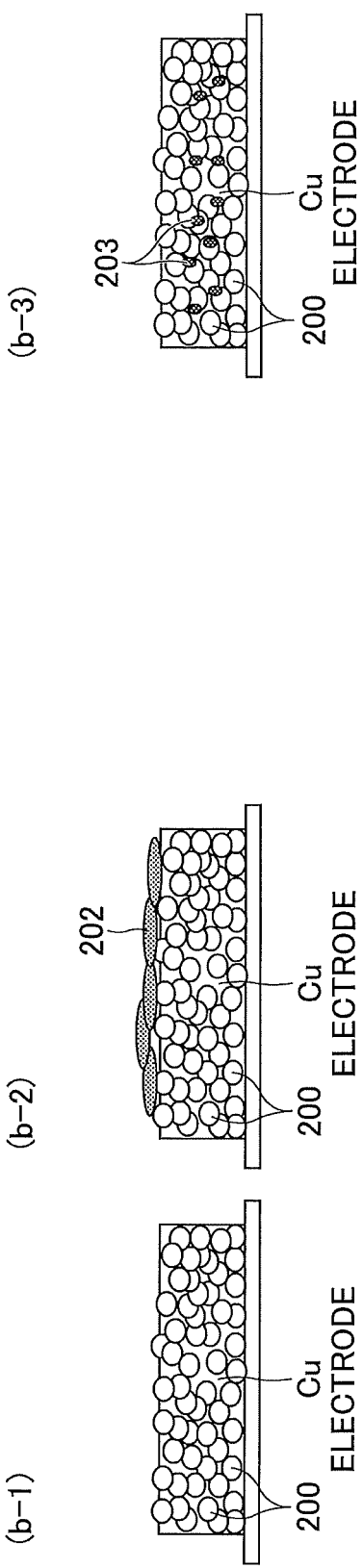

FIG.9
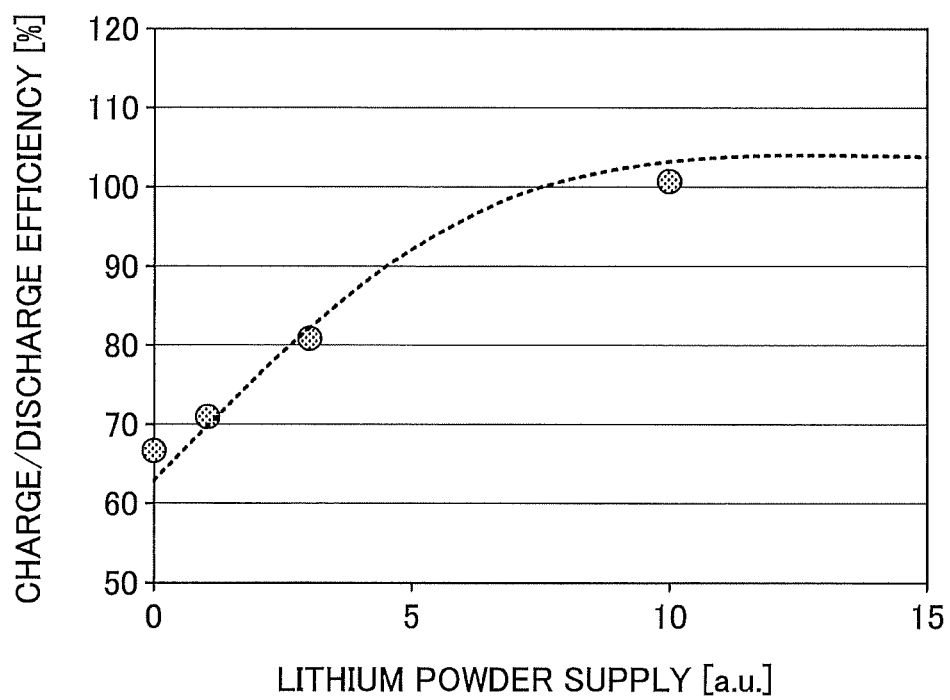
FIG.10
(a)
OXYGEN CONCENTRATION
$\leq$ 100 ppm
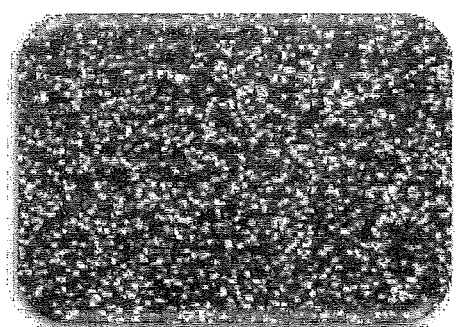
(b)
OXYGEN CONCENTRATION
$\fallingdotseq$ 1000 ppm
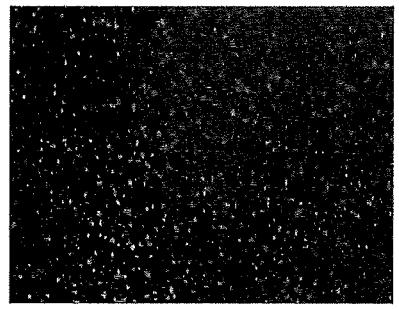

PLASMA SPRAYING DEVICE AND METHOD FOR MANUFACTURING BATTERY ELECTRODE

TECHNICAL FIELD

The present invention relates to a plasma spraying device and a method of manufacturing an electrode for a battery.

BACKGROUND

Plasma spraying is known in which powder of particles of feedstock, such as lithium (Li), is sprayed toward a surface of a substrate while melting by heat of a plasma jet formed from a high-speed gas, to form a coating on the surface of the substrate (see Patent Documents 1 to 3, for example).

In addition, a pre-lithiation technique for doping a negative electrode or a positive electrode with lithium-based material has been studied, in order to reduce irreversible reaction of a lithium-ion rechargeable battery and to improve efficiency of capacity of the lithium-ion rechargeable battery. For example, a device for manufacturing an electrode for a lithium-ion capacitor is known (see Patent Document 4, for example). In the device, by spraying lithium-containing powder onto an electrode sheet while melting the lithium-containing powder, to form a thin film of lithium, an electrode is doped with lithium ions.

CITATION LIST

Patent Document

Patent Document 1 Japanese Laid-open Patent Application Publication No. 06-325895
Patent Document 2 Japanese Laid-open Patent Application Publication No. 08-225916
Patent Document 3 Japanese Patent No. 5799153
Patent Document 4 Japanese Laid-open Patent Application Publication No. 2014-123663

SUMMARY

Problem to be Solved by the Invention

However, in pre-lithiation using existing spray or coating methods, in order to dope an electrode with lithium, it is necessary to deposit Li powder, which is formed by coating a surface of active lithium with organic or inorganic material, onto the electrode, to remove the organic or inorganic material on the surface of the lithium, and to diffuse the lithium into the electrode. In order to remove the organic or inorganic material, two steps are required: a step of pressing a film of Li to break the organic or inorganic material coating Li, and a step of removing the broken organic or inorganic material by a specific solvent. Thus, a process for manufacturing an electrode is complex. In addition, it is difficult to handle the specific solvent to remove the organic or inorganic material. Accordingly, at present, no mass production technology for existing pre-lithiation has been established.

Further, in a case in which thermal spraying feedstock having a low melting point is melted with high energy, because the thermal spraying feedstock may be sublimated and may become no longer liquid, the thermal spraying feedstock cannot be deposited.

In one aspect, to the above-described problem, the present invention is directed to depositing thermal spraying material of specific metal by plasma spraying.

Means for Solving Problem

In order to solve the above-described problem, according to one aspect, there is provision of a plasma spraying device including a supplying section configured to convey feedstock powder with a plasma generating gas, and to inject the feedstock powder and the plasma generating gas from an opening of a tip; a plasma generating section configured to generate a plasma by decomposing the injected plasma generating gas using electric power of 500 W to 10 kW; and a chamber causing the supplying section and the plasma generating section to be an enclosed region, which is configured to deposit the feedstock powder on a workpiece by melting the feedstock powder by the plasma generated in the enclosed region. The feedstock powder is any one of lithium (Li), aluminum (Al), copper (Cu), silver (Ag), and gold (Au). A particle diameter of the feedstock powder is between 1 μm and 50 μm.

According to another aspect, a method of manufacturing an electrode for a battery is provided. The method includes: injecting feedstock powder and plasma generating gas from an opening of a tip by conveying the feedstock powder with the plasma generating gas; generating a plasma by decomposing the injected plasma generating gas using electric power of 500 W to 10 kW; and depositing the feedstock powder on a surface of a substrate of the electrode for the battery, by melting the feedstock powder by the generated plasma. The feedstock powder is any one of lithium (Li), aluminum (Al), copper (Cu), silver (Ag), and gold (Au). A particle diameter of the feedstock powder is between 1 μm and 50 μm.

Effect of Invention

According to one aspect, feedstock of particular metal can be deposited by plasma spraying.

BRIEF DESCRIPTION OF THE DRAWINGS

FIG. 2 is a diagram comparing a plasma jet according to the embodiment with a comparative example;

FIG. 4 is a diagram comparing a footprint of the plasma spraying device according to the embodiment with the comparative example;

FIG. 5 is a diagram illustrating a pre lithiation technique;

FIG. 6 is a diagram comparing a plasma spraying process according to the embodiment with the comparative example;

FIG. 9 is a diagram illustrating a result of the charging/discharging test of a battery manufactured by using the plasma spraying process according to the embodiment;

FIG. 10 is a diagram illustrating results of an Li film deposited by using the plasma spraying process according to the embodiment.

DESCRIPTION OF EMBODIMENTS

Figure 1:
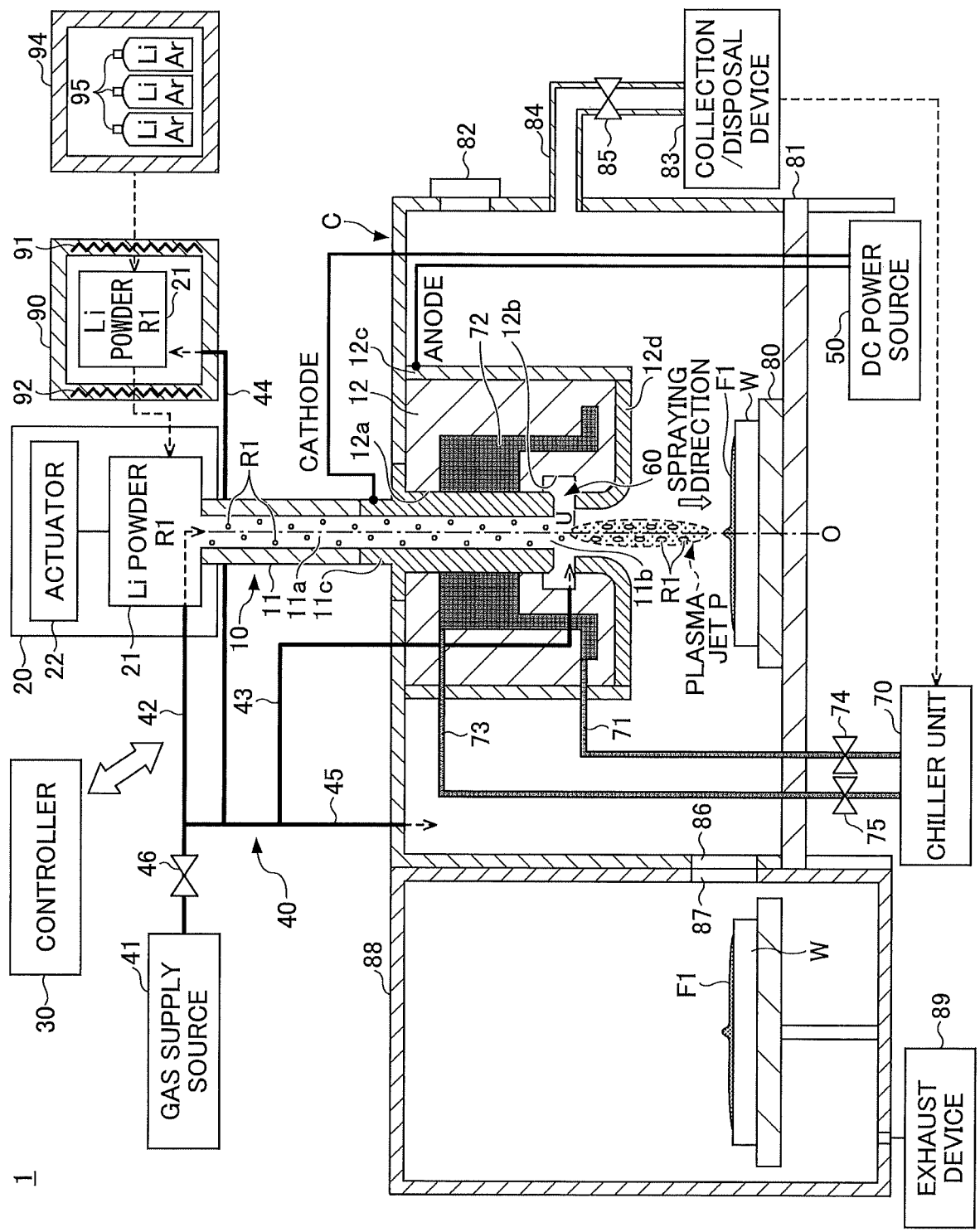
FIG. 1 is a diagram illustrating an example of an overall configuration of a plasma spraying device according to an embodiment.

Hereinafter, embodiments for carrying out the present invention will be described with reference to the drawings. In the present specification and drawings, elements having substantially identical features are given the same reference symbols and overlapping descriptions may be omitted.

Plasma Spraying Equipment

First, an entire configuration of a plasma spraying device 1 according to one embodiment of the present invention will be described with reference to FIG. 1. The plasma spraying device 1 injects powder of lithium (hereinafter referred to as "lithium powder R1") from an opening 1ib located at a tip of a nozzle 11, melts the lithium powder R1 by heat of a plasma jet P formed by high-speed gas, and sprays the molten lithium powder R1 toward a surface of a substrate W to form an Li film F1 on the surface of the substrate W.

Examples of the substrate W include electrodes made from copper (Cu), carbon (C), Si-containing carbon, SiO, Si, or the like. For example, in the plasma spraying device 1 according to the present embodiment, by completely melting and depositing the lithium powder R1 on a copper electrode, the plasma spraying device 1 can dope, with lithium ions, the electrode used for a lithium-ion rechargeable battery.

The lithium powder R1 is an example of feedstock powder for thermal spraying. The feedstock powder for thermal spraying according to the present embodiment is not limited to lithium powder, and may be any one of aluminum (Al), copper (Cu), silver (Ag), and gold (Au). In addition, the feedstock powder for thermal spraying according to the present embodiment includes fine lithium particles coated with organic or inorganic material. The coated fine particles are not limited to lithium, but may be aluminum (Al), copper (Cu), silver (Ag), or gold (Au).

As will be described below, because the plasma spraying device 1 according to the present embodiment melts feedstock for thermal spraying with low energy, powder of the feedstock does not sublimate, and can be deposited in a liquid state. Accordingly, one of advantages of the plasma spraying device 1 according to the present embodiment is that the plasma spraying device 1 according to the present embodiment can be used for thermal spraying and depositing feedstock, even if the feedstock having a low melting point, such as lithium, is used. Accordingly, the plasma spraying device 1 according to the present embodiment is particularly suitable when powder of metal with a low melting point, such as lithium, is used as feedstock. Note that a melting point of lithium is 180° C., a melting point of solder is 200° C., a melting point of aluminum is 660° C., a melting point of copper is 1100° C., a melting point of silver is 962° C., and a melting point of gold is 1064° C.

In addition, in a case in which feedstock powder is melted by heat of the plasma jet P, even if the feedstock powder is coated with organic or inorganic coating material, the plasma spraying device 1 according to the present embodiment melts and evaporates the coating material. Accordingly, a process of removing the coating material is not required.

The plasma spraying device 1 includes a supplying section 10, a controller 30, a gas supplying section 40, a plasma generating section 60, a chamber C, a feeder preparation room 90, a powder storage room 94, a collection/disposal device 83, and a dry chamber 88.

The supplying section 10 includes a nozzle 11 and a feeder 20. The supplying section 10 conveys Li powder R1 with a plasma generating gas, and injects the Li powder R1 from an opening at the tip. The feeder 20 supplies the Li powder R1 to the nozzle 11. The Li powder R1 is stored in a container 21 in the feeder 20. The Li powder R1 is fine powder having a particle diameter between 1 μm and 200 μm.

The feeder 20 includes an actuator 22. The nozzle 11 is a straight tubular member, in which a flow passage 11a for conveying the Li powder R1 is formed. The flow passage 11a of the nozzle 11 communicates with the container 21. By vibrating the container 21 with the power of the actuator 22, the Li powder R1 is entered from the container 21 into the flow passage 11a in the nozzle 11.

In addition to the Li powder R1, the plasma generating gas is supplied to the nozzle 11. The plasma generating gas is a gas for generating a plasma, and also serves as a carrier gas for conveying the Li powder R1 in the flow passage 11a. In the gas supplying section 40, the plasma generating gas is supplied from a gas supply source 41, opening/closing and flow rate are controlled through a valve 46 and a mass flow controller (MFC), and the plasma generating gas is conveyed to the flow passage 11a of the nozzle 11 through a pipe 42. Gases such as argon gas, helium gas, nitrogen gas ($N_2$), hydrogen gas ($H_2$), or a combination of these gases can be used as the plasma generating gas. In the present embodiment, an example of supplying argon gas (Ar) as the plasma generating gas will be described.

The nozzle 11 runs through a main unit 12 of the plasma generating section 60 and the tip of the nozzle 11 protrudes into a plasma generating space U. The Li powder R1 is conveyed to the tip of the nozzle 11 by the plasma generating gas, and is injected into the plasma generating space U from the opening 11b of the tip, with the plasma generating gas.

The main unit 12 is formed of insulating material. The main unit 12 has a through-hole 12a at a central axis of the main unit 12. A first half 11c of the nozzle 11 is inserted into the through-hole 12a of the main unit 12. The first half 11c of the nozzle 11 is connected to a direct current (DC) power source 50 and also functions as an electrode (cathode) to which current is supplied from the DC power source 50. The nozzle 11 is formed of metal.

The plasma generating space U is a space defined mainly by a recess 12b of the main unit 12 and a projecting part 12d, and the tip of the nozzle 11 protrudes into the plasma generating space U. The projecting part 12d is connected at one end to a metal plate 12c provided on the outer wall of the main unit 12. The metal plate 12c is connected to the DC power source 50. As a result, the metal plate 12c and the projecting part 12d function as an electrode (anode).

Between the electrodes, an electrical power between 500 W and 10 kW is supplied from the DC power source 50. Accordingly, discharge occurs between the tip of the nozzle 11 and the other end of the projecting part 12d. Accordingly, the plasma generating section 60 ionizes (decomposes) the argon gas injected from the nozzle 11 in the plasma generating space U, and generates an argon plasma.

In addition, the argon gas supplied into the plasma generating space U generates a rotational flow. The argon gas is supplied from the gas supply source 41, opening/closing and flow rate are controlled through a valve 46 and a mass flow controller (MFC). Subsequently, the argon gas flows into the main unit 12 through a pipe 43, and is supplied into the plasma generating space U in a lateral direction.

Although only one supply path for the argon gas introduced into the plasma generating space U is illustrated in FIG. 1, multiple supply paths are provided in the main unit 12. Accordingly, the argon gas is supplied from the multiple supply paths to the plasma generating space U in a form of a rotational flow. This prevents the diffusion of the generated plasma, and the plasma jet P is linearly emitted. Accordingly, the plasma generating section 60 decomposes the plasma generating gas injected from the tip of the nozzle 11, and generates the plasma jet P having a common axis O with the nozzle 11. In this embodiment, "having a common axis" means that a central axis of the supplying section 10 (nozzle 11) coincides with or almost coincides with a central axis of a spraying direction of the plasma jet generated by the plasma generation section 60.

According to the above-described configuration, the supplying section 10 causes the Li powder R1 and the argon gas to linearly flow through the flow passage 11a formed inside the nozzle 11, and injects the Li powder R1 and the argon gas into the plasma generating space U, from the opening 11b of the tip. The injected Li powder R1 is sprayed toward the surface of the substrate W while being melted by the heat of the plasma jet P formed from the high-speed argon gas, and forms the Li film F1 on the surface of the substrate W by thermal spraying.

A coolant flow passage 72 is formed inside the main unit 12. Coolant supplied from a chiller unit 70 circulates through the coolant pipe 71, the coolant flow passage 72, and a coolant pipe 73 in accordance with opening and/or closing of the valves 74 and 75, and returns to the chiller unit 70. The coolant cools the main unit 12, and prevents the main unit 12 from being overheated by heat of the plasma. At a side wall of the chamber C, a window 82 for viewing the inside of the chamber C is provided.

[Axial Structure]

In the plasma spraying device 1 according to the present embodiment having the aforementioned configuration, as illustrated in FIG. 2(b), the nozzle 11 of the supplying section 10 is configured to have a common axis with the plasma jet P. Accordingly, the spraying direction of the Li powder R1 can be made to be the same as a direction of the plasma jet P. That is, Li powder R1 is supplied coaxially with the plasma jet P. This improves the directivity of thermal spraying and allows the Li film having a high aspect ratio to be formed.

On the other hand, in a plasma spraying device 9 of a comparative example, as illustrated in FIG. 2(a), powder of sprayed particles is supplied perpendicular to the plasma jet P, from a supply pipe 7 disposed perpendicularly to the plasma jet P formed in front of a nozzle 8. For this reason, if a particle diameter of powder R2 for thermal spraying is small, the powder R2 is repelled at a boundary layer of the plasma jet P and cannot enter the plasma. Therefore, in the case of the plasma spraying device 9 of the comparative example, as illustrated in a table located at a lower left of FIG. 2, a particle diameter of the Li powder R2 is 30 μm to 100 μm. On the other hand, a particle diameter of the Li powder R1 used in the plasma spraying device 1 according to the present embodiment is 1 μm to 50 μm, as illustrated in a table located at a lower right of FIG. 2. Therefore, as compared with the Li powder R1, the Li powder R2 is 10 times larger in particle diameter, and is 1,000 times larger in volume.

Accordingly, in the case of the plasma spraying device 9 of the comparative example, in order to melt the feedstock Li powder R2 by the plasma, amount of electric power supplied from a DC power source must be twice or larger than that of the plasma spraying device 1 of the present embodiment. As a result, in the case of the plasma spraying device 9, a more expensive DC power source with a larger maximum power is required.

On the other hand, in the case of the plasma spraying device 1 according to the present embodiment, the Li powder R1 is of a fine particle having a particle diameter of approximately a few micrometers, and is supplied in a gradual manner, approximately 1/10 of a feed amount of the comparative example.

Accordingly, amount of electric power required for melting the Li powder can be reduced, as compared to a conventional method. In the present embodiment, because it is sufficient that electric power of 500 W to 10 kW is supplied, plasma spraying can be performed by using the DC power source 50 whose maximum electric power is low. Accordingly, an expensive heat source is not required, power consumption during plasma spraying is reduced, and cost can be reduced. In addition, the plasma spraying device 1 of the present embodiment can reduce total weight of the plasma spraying device 1 to approximately 1/10 of the plasma spraying device 9 of the comparative example. When the Li powder R1 is powder of lithium fine particles coated with organic or inorganic material, a particle diameter of the Li powder R1 is 1 μm to 200 μm. However, amount of heat needed to melt the Li powder R1 is almost equal to amount of heat required for melting lithium. Thus, unless the amount of lithium varies, amount of electric power required may be approximately the same as for uncoated Li powder. This is also applicable to a case in which particles are made from other materials.

In the case of the plasma spraying device 1 according to the present embodiment, the nozzle 11 of the supplying section 10 has a common axis with the plasma jet P, and the spraying direction of the Li powder R1 is the same as that of the plasma jet P. Thus, the aspect ratio of the Li film F1 can become greater than 1.

The number of the nozzles 11 of the supplying section 10 may be one, or more than one. In a case in which multiple nozzles 11 are arranged in parallel, instead of the substrate W, a roll-type electrode sheet may be placed below the nozzles 11, the roll-type electrode sheet may be slid from one side of a stage 80 to the other side, and may be wound up. Thus, the multiple nozzles 11 arranged in parallel scan the electrode sheet, and an Li film is formed on the electrode sheet. In this case, multiple feeders 20 may be provided in accordance with the number of the nozzles 11. Also, a shape of the chamber C is not limited to a cylindrical shape, but may be, for example, a rectangular shape.

[Chamber]

Referring back to FIG. 1, the plasma spraying device 1 includes the chamber C. The chamber C is a cylindrical hollow container which is formed of, for example, aluminum, stainless steel, or quartz. The chamber C supports the main unit 12 at a ceiling, and makes the supplying section 10 and the plasma generating section 60 an enclosed region. The substrate W is placed on the stage 80 located at a bottom 81 of the chamber C. In the present embodiment, an inside of the chamber C is decompressed to a predetermined pressure. However, the inside of the chamber C may not necessarily be decompressed.

The Li powder R1 may explode when exposed to moisture. Also, when the Li powder R1 reacts with nitrogen or oxygen, the Li powder R1 is converted to a nitride or an oxide, thereby changing from an active state to a stable state. This reduces a charging/discharging function of a lithium-ion battery which is charged or discharged by lithium ions being moved between a positive electrode and a negative electrode.

Therefore, it is preferable that the Li powder R1 is stored in a space in which moisture, oxygen, and nitrogen components are reduced as low as possible. Accordingly, by making the supplying section 10 and the plasma generation section 60 an enclosed region by the chamber C, the plasma spraying device 1 reduces moisture, oxygen, and nitrogen as low as possible in the container 21 in which the Li powder R1 is stored and in the chamber C including the nozzle 11 and the plasma generating space U.

In addition, the inside of the chamber C is filled with argon gas. The argon gas is supplied from the gas supply source 41 through a pipe 45 into the chamber C. However, the gas to be filled inside the chamber C may be an inert gas as well as argon gas. Thus, for example, oxygen concentration inside the chamber C can be reduced to a range approximately between 10 ppm ($10^{-4}$%) and 100 ppm ($10^{-3}$%), or less than the range, and oxygen concentration in the Li film deposited on a Cu electrode (substrate) can be reduced to approximately 0.5%. Conversely, in a case in which thermal spraying is performed in atmospheric space, oxygen concentration in the atmospheric space is 21%, and oxygen concentration in the Li film deposited on the Cu electrode (substrate) becomes approximately 5.0%. Thus, according to the plasma spraying in the present embodiment, by forming film without causing the Li powder R1 to react with nitrogen or oxygen, characteristics of the film can be improved, and efficiency of a battery can be improved. The result of an experiment on the efficiency of an Li-ion rechargeable battery will be described below.

[Feeder Preparation Room/Powder Storage Room]

Feeder preparation room 90 is a chamber forming an enclosed region for storing the Li powder R1 in the container 21 prior to being placed in the feeder 20. After the Li powder R1 is stored into the container 21 in the feeder preparation room 90, the container 21 is placed in the feeder 20.

The inside of the feeder preparation room 90 is filled with an inert gas, such as argon gas, supplied from the gas supply source 41 through a pipe 44.

As described above, it is preferable that the Li powder R1 is stored in a space in which moisture, oxygen, and nitrogen are reduced as low as possible. Because the feeder preparation room 90 provides a space for storing the Li powder R1 into the container 21 as the enclosed space, the Li powder R1 can be stored into the container 21 in an environment in which moisture, oxygen, or nitrogen is excluded to the extent possible.

The feeder preparation room 90 also includes heating units 91 and 92 for heating the inside. The heating units 91 and 92 may be, for example, heaters. This can reduce moisture in the feeder preparation room 90.

In addition, the inside of the feeder preparation room 90 is purged with argon gas. Argon gas is supplied from the gas supply source 41 through the pipe 44. However, the gas filled inside the feeder preparation room 90 may be an inert gas such as helium gas, as well as argon gas. This allows the Li powder R1 to be stored in the container 21 without being reacted with nitrogen or oxygen, and can improve efficiency of a battery which is made by thermal spraying using the Li powder R1.

The powder storage room 94 includes a cabinet or the like for preserving the Li powder R1 prior to being stored into the container 21 in the feeder preparation room 90. The inside of the powder storage room 94 is dehumidified by a dehumidifier, and is maintained at a humidity of 30% to 55%. Bottles 95 containing Li powder R1 and argon gas are stored inside the powder storage room 94. Accordingly, the Li powder R1 is prevented from being reacted with moisture, oxygen and nitrogen, before the Li powder R1 is provided in the feeder 20.

[Collection/Disposal Device]

The collection/disposal device 83 draws argon gas and Li powder inside the chamber C through the exhaust pipe 84 by opening and closing a valve 85, and disposes of the Li powder. The internal configuration of the collection/disposal device will be described below with reference to FIG. 11.

[Dry Chamber]

The dry chamber 88 is provided adjacent to the chamber C, and forms an enclosed region dehumidified to a predetermined humidity. The dry chamber 88 is also depressurized to a predetermined pressure by an exhaust device 89. However, the dry chamber 88 is not required to be depressurized.

The substrate W after deposition is conveyed to the dry chamber 88, and then conveyed to a next step. In order to prevent the Li film F1 from being reacted with nitrogen or oxygen to the extent possible in a conveying process of the substrate W after deposition, the substrate W after deposition is immediately loaded into the dry chamber 88 from gate valves 86 and 87.

[Controller]

The plasma spraying device 1 includes the controller 30. The controller 30 controls the plasma spraying device 1. Specifically, the controller 30 controls the gas supply source 41, the feeder 20 (actuator 22), the DC power source 50, the chiller unit 70, and the collection/disposal device 83.

The controller 30 includes a CPU, a ROM (Read Only Memory), a RAM (Random Access Memory), and an HDD (Hard Disk Drive). The CPU 31 selects a program (recipe) for depositing particular metal feedstock for plasma spraying, and sets the program (recipe) to RAM. The CPU transmits a control signal to each unit based on the program stored in the RAM. Accordingly, an Li film F1 having a desired characteristic can be thermal sprayed on the substrate W. The function of the controller 30 may be implemented using software or may be implemented using hardware.

[Effect]

(Plasma Spraying of Feedstock with Low Melting Point)

In the plasma spraying device 1 according to the present embodiment, a small amount of Li powder of fine particles having a particle diameter of 1 μm to 50 μm is supplied in a gradual manner, such as several grams/min. On the other hand, in the plasma spraying device 9 according to the comparative example, an Li powder of particles having a particle diameter of 30 μm to 100μ is supplied at a rate of several tens of grams/min (see FIG. 2).

Therefore, in the plasma spraying according to the present embodiment, the Li powder can be melted with electric power lower than that required by the plasma spraying according to the comparative example. The DC power source 50 according to the present embodiment is controlled so that electric power applied to the electrode is between 500 W and 10 kW.

Figure 3:
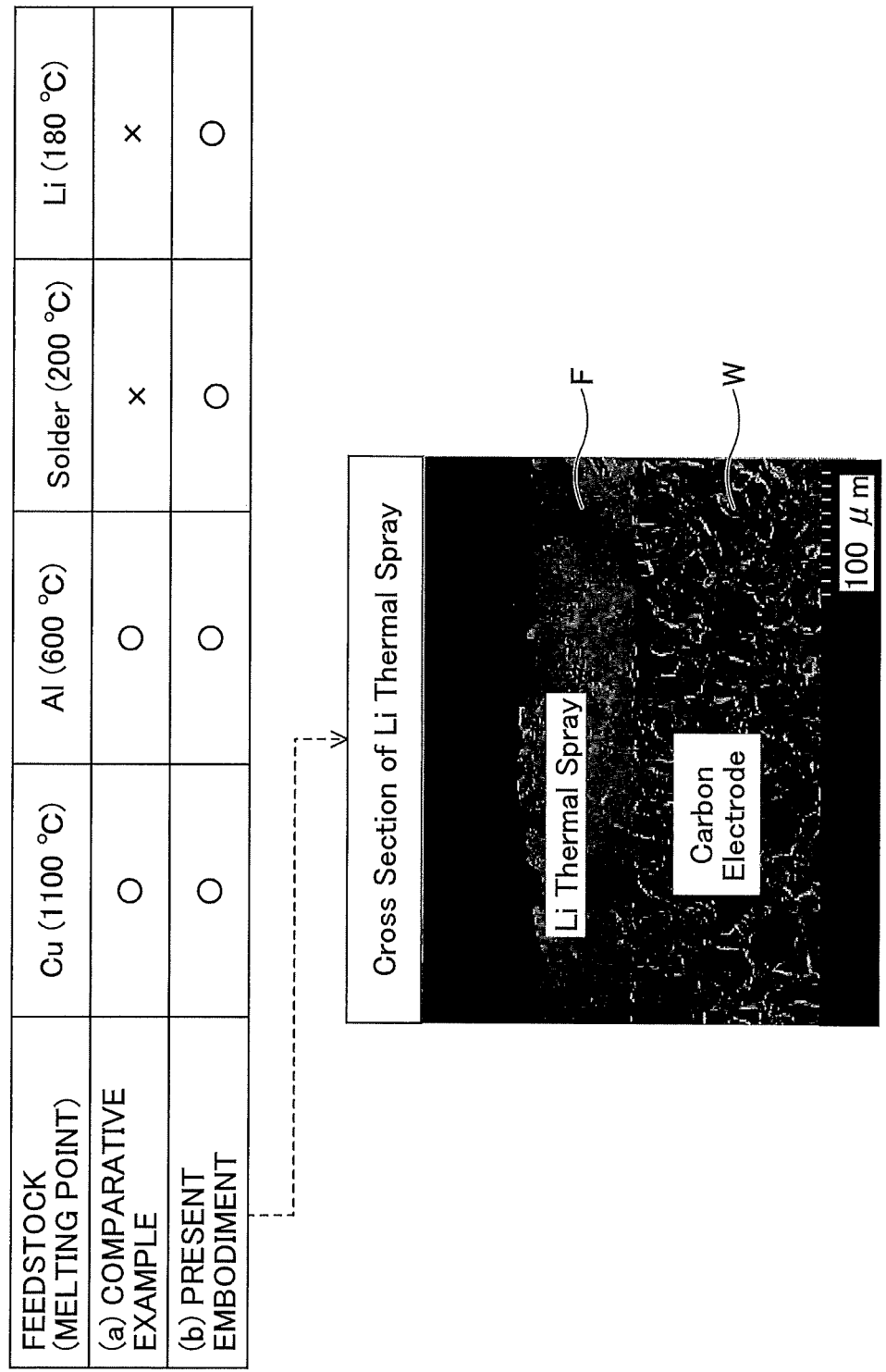
FIG. 3 is a cross-sectional view illustrating an example of film formed by the plasma spraying device according to the embodiment.

Accordingly, as illustrated in a row (a) of FIG. 3, the plasma spraying according to the comparative example can deposit material with a high melting point, but it is impossible to deposit material with a low melting point, such as solder or lithium. On the other hand, in the plasma spraying according to the present embodiment, material having a high melting point and material having a low melting point can be deposited.

The reason is that, in the plasma spraying according to the comparative example, the material is melted with electric power not less than twice that of the plasma spraying according to the present embodiment. As a result, in a case in which material with a low melting point is used, the material is sublimated to gas due to high energy in the plasma, and the material cannot be deposited because the material is not present as a liquid. On the other hand, in the plasma spraying according to the present embodiment, because the material is melted by low energy in the plasma and is present as a liquid, the material can be deposited on the substrate W even if a melting point of the material is low.

An example of a cross-section of the Li film F1 formed on the substrate W by the plasma spraying device 1 according to the present embodiment is illustrated in FIG. 3. Here, the substrate W is a carbon electrode, and the Li film F1 is formed on the carbon electrode. A surface of the Li film F1 is flat, and a hole or the like is not formed in the film or at a boundary between the film and the carbon electrode, indicating that a dense film is formed.

(Device Size)

In the plasma spraying device 9 of the comparative example illustrated in FIG. 4(a), a large-scale DC power source 6 having a maximum power of 1000 kW is disposed. In addition, because a feeder 5, a feeder CTL (controller) 4, a robot arm 3, a robot CTL (controller) 2, and the like, are provided, a size of the device increases.

Conversely, in the plasma spraying device 1 according to the present embodiment illustrated in a diagram (b) of FIG. 4, the small DC power source 50 having a maximum power of 500 W to 10 kW is disposed. Due to the small DC power source 50, the feeder 20 of the plasma spraying device 1, the nozzle 11, the main unit 12 of the plasma generation, and the like can be arranged compactly in a vertical direction, and the footprint can be reduced. In addition, in the plasma spraying device 1 according to the present embodiment, a total weight of the device can be approximately 1/20 of the plasma spraying device 9 according to the comparative example, and amount of power used for plasma spraying can be approximately 1/10 (when forming Cu film) compared to the plasma spraying device 9 according to the comparative example. Thus, the plasma spraying device 1 can facilitate maintenance and reduce power consumption. Further, because a space in which the plasma spraying is performed is made to be an enclosed region by the chamber C, a high-quality Li film can be formed in an environment containing as little hydrogen gas as possible.

(Pre-lithiation Process)

When a lithium-ion rechargeable battery is charged as illustrated in FIG. 5(a), lithium ions move from a positive electrode to a negative electrode. When the lithium-ion rechargeable battery is discharged as illustrated in FIG. 5(b), lithium ions move from the negative electrode to the positive electrode. In the above, chemical reactions occurring at the positive electrode and the negative electrode, and an overall reaction are as follows:

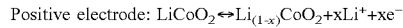
Positive electrode: $LiCoO_2 \leftrightarrow Li_{(1-x)}CoO_2 + xLi^+ + xe^-$

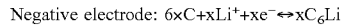
Negative electrode: $6 \times C + xLi^+ + xe^- \leftrightarrow xC_6Li$

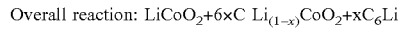
Overall reaction: $LiCoO_2 + 6 \times C \; Li_{(1-x)}CoO_2 + xC_6Li$

However, in the discharge of FIG. 5(b), part of the lithium ions may react with metal material (e.g., carbon) of the negative electrode, and may not move to the positive electrode. In this case, the lithium ions remaining in the negative electrode cannot be used in charging capacity. That is, 100% of capacity of a battery cannot be used effectively. For example, in the case of FIG. 5(b), only 80% of the maximum capacity of the battery is utilized.

In order to suppress such an irreversible reaction of a lithium-ion rechargeable battery and to improve efficiency of capacity of a lithium-ion rechargeable battery, there is a technique called pre-lithiation for doping a negative or positive electrode with lithium-based material. In the pre-lithiation, by adding 10 to 20% of lithium ions that will be lost (do not move to the positive electrode) to the negative electrode or the positive electrode in advance, battery capacity is increased, and thereby efficiency of the battery is improved.

A process for doping a negative electrode or a positive electrode with lithium ions in a conventional pre-lithiation is illustrated in FIG. 6(a) as a comparative example, and a process for doping a negative electrode or a positive electrode with lithium ions in a pre-lithiation technique according to the present embodiment is illustrated in FIG. 6(b). An electrode of a substrate may be copper or other metal. The substrate is configured such that a binder of carbon 200 (or graphite) is formed on the electrode.

In the pre-lithiation technique of the comparative example, lithium-containing material 201 illustrated in FIG. 6(a-2), in a state in which Li powder 201a is coated with an organic film 201b, is sprayed or applied to a surface of the substrate illustrated in FIG. 6(a-1).

Next, as illustrated in FIG. 6(a-3), the organic film 201b is broken by applying pressure to the substrate. Subsequently, when the organic film 201b is removed, an Li film 202 remains. The Li film 202 diffuses into the binder. As a result, lithium ions 203 diffuse into the substrate, as illustrated in FIG. 6(a-4). Accordingly, an electrode that is doped with the lithium ions 203 in advance is manufactured.

As illustrated in a graph of FIG. 5(c), because a capacity of a lithium-ion rechargeable battery, to which the pre-lithiation has been applied, is approximately 10% to 15% larger than that of a lithium-ion rechargeable battery to which the pre-lithiation is not applied, utilization efficiency improves. Larger capacity is one of the most important characteristics of a battery because a large capacity allows a lithium-ion rechargeable battery to be used for a long period of time.

However, in the pre-lithiation technique of the comparative example, the pressing step and the step of removing the organic film 201b are required, as illustrated in FIG. 6(a-3). In addition, a highly toxic and difficult-to-handle solvent is required to remove the organic film 201b. For this reason, mass production was difficult with the conventional pre-lithiation technique of the comparative example.

Accordingly, in the present embodiment, an Li film is formed using the plasma spraying device 1, and the pre-lithiation to the electrode is realized by plasma spraying. Specifically, in the pre-lithiation technique of the present embodiment, Li powder supplied from the nozzle 11 of the plasma spraying device 1 melts in the plasma jet P, becomes a liquid, and is deposited on a surface of the substrate in FIG. 6(b-1), and an Li film 202 illustrated in FIG. 6(b-2) is formed. The Li film 202 diffuses into the binder. As a result, as illustrated in FIG. 6(b-3), lithium ions 203 diffuse into the substrate, and an electrode that is doped with the lithium ions 203 in advance is manufactured.

In a case in which the Li powder is a lithium particle coated with organic or inorganic material, the Li powder is also melted in the plasma jet P, becomes a liquid, and is deposited on the surface of the substrate in FIG. 6(b-1). Thus, the Li film 202 illustrated in FIG. 6(b-2) is formed. However, because coating film of the lithium particle is melted and evaporated in the plasma jet P, only Li is deposited on the substrate W as a film.

Figure 7:
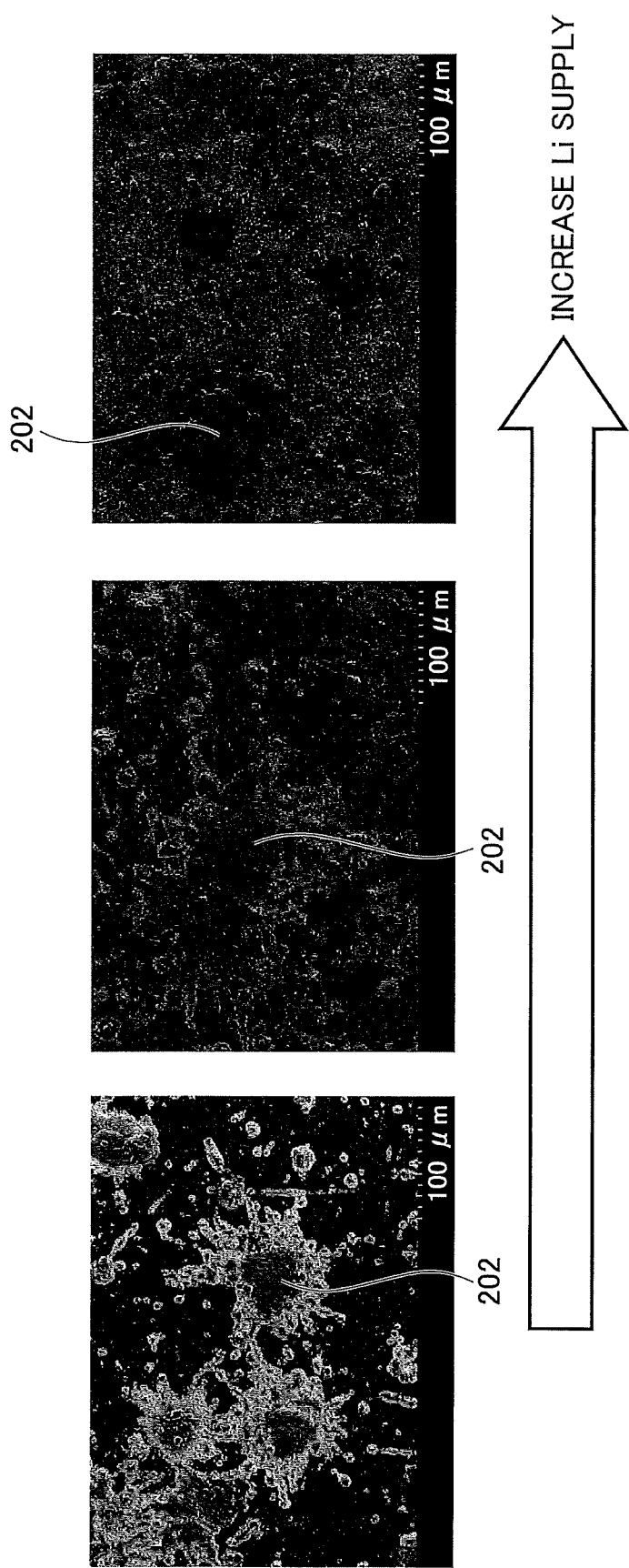
FIG. 7 is a top view corresponding to FIG. 6 (b-2) of the plasma spraying process according to an embodiment.

FIG. 7 illustrates examples of a planar view of a SEM image at a state of FIG. 6(b-2) in a plasma spraying process according to the present embodiment. As illustrated in FIG. 7, at the state of FIG. 6(b-2), the coating film is broken by the plasma jet and evaporated. As a result, it can be seen that the Li film 202 is formed.

Conventionally, an Li film is coated with a coating film, as described in the paper "Electromechanical Probing of Li/Li$_2$Co$_3$ Core/Shell Particles in a TEM, Bin Xiang, Lei Wang, Gao Liu and Andrew M. Minor".

In the present embodiment, the pressing step and the step of removing the organic film 201b, which are illustrated in FIG. 6(a-3), and which were required in the comparative example, are not required. In addition, the use of a difficult-to-handle solvent to remove the organic film 201b is eliminated. Thus, the plasma spraying device 1 according to the present embodiment realizes mass production of an electrode for an Li-ion rechargeable battery doped with lithium ions by pre-lithiation.

Figure 8:
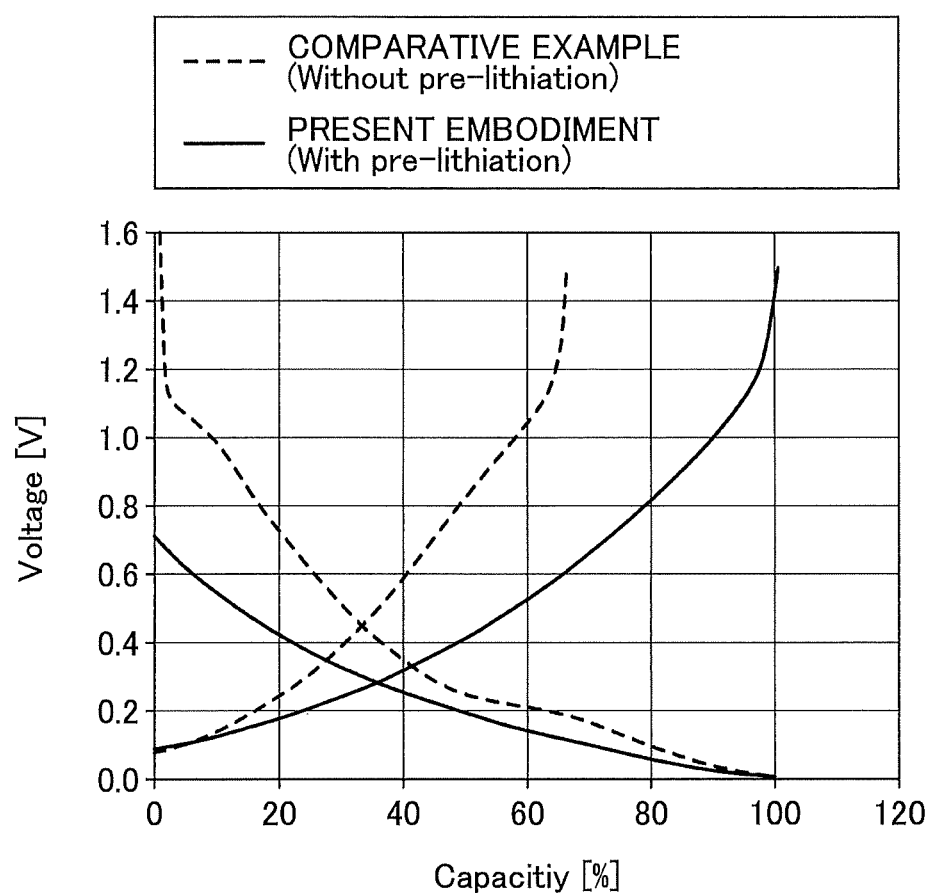
FIG. 8 is a diagram illustrating results of a charging/discharging test of a battery manufactured by using the plasma spraying process according to the embodiment.

FIGS. 8 and 9 illustrate results of charging/discharging tests of a battery manufactured by the plasma spraying process according to the present embodiment. The lithium powder used is lithium fine particles coated with organic or inorganic material.

In the charging/discharging test, a certain amount of lithium was sprayed onto the substrate W by the plasma spraying process according to the present embodiment, and a coin cell was constructed in a glove box with an argon atmosphere having a dew point of −60° C. or less. The electrode was punched with a φ16 mm, a counter electrode was of lithium metal, a separator was polypropylene resin film, and a salt of the electrolyte was LiPF6 (1M). Also, as a solvent, EC (ethylene carbonate):DEC (diethyl carbonate) =1:1 was used. After the coin cell was constructed, 24 hours of aging was performed, and the charging/discharging test was performed.

Conditions of charging/discharging were as follows:
Charging (Li insertion): CC charging, Current: 0.1C, End voltage: 0.0 V, Stop time: 10 minutes Discharge (Li desorption): CC discharging, Current: 0.1C, End voltage: 1.5 V, Stop time: 10 minutes.

CC stands for Constant Current, CC charging means constant current charging, and CC discharging means constant current discharging.

A unit of "C" in "current 0.1C" is ampere, and "1C" represents magnitude of current required for fully charging a battery in one hour. For example, if a battery is to be fully charged in 10 hours, current of 0.1C needs to be applied to the battery, and if a battery is fully charged in 30 minutes, current of 2C needs to be applied to the battery. When capacity of a battery is presented on a vertical axis and a time is presented on a horizontal axis, the C corresponds to a slope when constant current charging is performed.

Charging/discharging curves of the results of the initial charging/discharging test are illustrated in FIG. 8. A horizontal axis indicates a ratio of charge capacity or discharge capacity, and a vertical axis indicates voltage. Dashed lines represent results for a battery according to a comparative example manufactured without applying lithium pre-lithiation described in the present embodiment. Solid lines represent results for a battery according to the present embodiment manufactured by applying the plasma spraying process of the present embodiment. Lithium powder used is lithium fine particles coated with organic or inorganic material. In a case in which magnitude of a charging capacity is 100, it can be seen that a discharging capacity of the battery manufactured in the process according to the comparative example is only 67% of the charging capacity, whereas a discharging capacity of the battery manufactured in the present embodiment is approximately 100%. That is, initial charging/discharging efficiency is improved in a battery manufactured by using the plasma spraying process according to the present embodiment. Note that charging/discharging efficiency is a ratio of the discharging capacity value to the charging capacity.

FIG. 9 illustrates results of similar charging/discharging tests, which were performed by varying supply amount of lithium powder used in the plasma spraying process according to the present embodiment. FIG. 9 illustrates a relationship between charging/discharging efficiency presented on a vertical axis and the supply amount of lithium powder presented on a horizontal axis. The lithium powder used herein is also lithium fine particles coated with organic or inorganic material. The supply amount of the lithium powder is expressed in an arbitrary unit (a.u.). The initial charging/discharging efficiency increases in accordance with an increase in lithium powder supply. This indicates that, in a battery manufactured in the present embodiment, an amount of pre-doped lithium can be controlled based on the supply amount of lithium powder.

FIG. 10 is of diagrams illustrating states of Li powder deposited on a Cu electrode (substrate) in cases in which oxygen concentration inside the chamber C is changed in the plasma spraying process according to the present embodiment. The lithium powder used herein is also lithium fine particles coated with organic or inorganic material. A mottle of white spots is Li deposited on the Cu electrode. With respect to the oxygen concentration, after the interior of the chamber C is sufficiently exhausted, oxygen was introduced into the chamber C from an unillustrated location point different from the plasma generating gas, so as to set to a predetermined oxygen concentration.

FIG. 10(a1) shows a result of a plasma sprayed film formed in accordance with the present embodiment in which the oxygen concentration was 100 ppm or less, and FIG. 10(b) is the result in which the oxygen concentration was 1000 ppm. From the result in which the oxygen concentration was 100 ppm or less, at a time immediately after the Cu electrode was unloaded from the chamber C, metal gloss was observed on the deposited Li, and oxidation of the deposited Li was not observed. Also, no oxidation of the Cu electrode was observed. On the other hand, from the result in which the oxygen concentration was 1000 ppm, at a time when the Cu electrode was unloaded from the chamber C, the deposited Li had no metallic gloss and was a white oxide. The Cu electrode was also oxidized and was discolored. According to the above-described results, it can be said that if the oxygen concentration in the chamber C is 100 ppm or less, plasma spraying can be applied without causing oxidation.

[Collection/Disposal Device]

Figure 11:
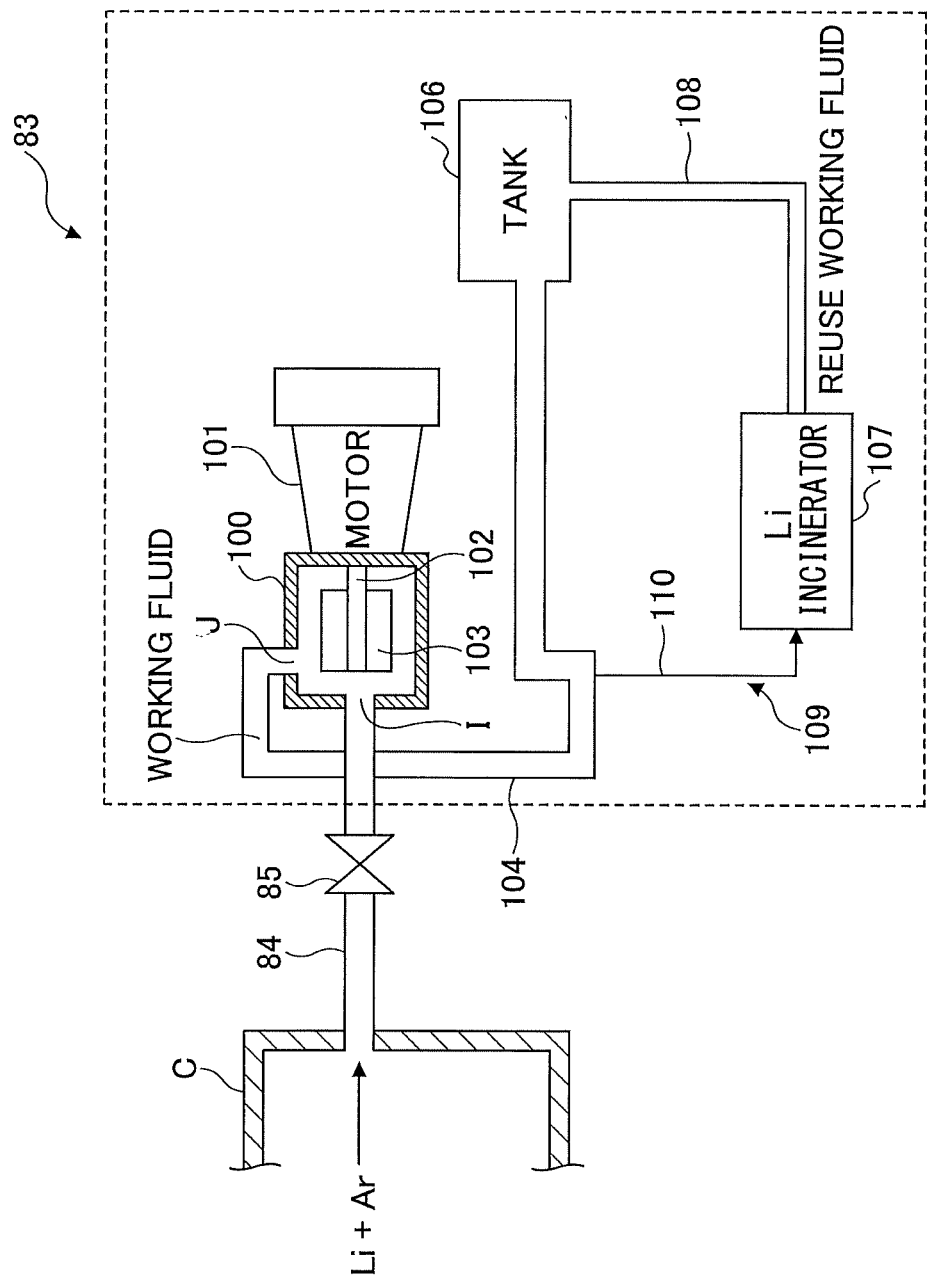
FIG. 11 is a diagram illustrating an example of a collection/disposal device according to the embodiment.

Lastly, the collection/disposal device 83 will be described with reference to FIG. 11, which collects and disposes of Li powder in the chamber C of the plasma spraying device 1 according to the present embodiment illustrated in FIG. 1. The collection/disposal device 83 includes a liquid seal pump 100, a motor 101, an impeller 103, a pipe 104, a tank 106, a pipe 108, and a disposal mechanism 109.

The liquid seal pump 100 draws lithium not having been used for plasma spraying (hereinafter referred to as "lithium sprayed waste") and argon gas from inside of the chamber C, and seals the drawn lithium sprayed waste and argon gas with a working liquid.

The liquid seal pump 100 is filled with a fluorine-based solvent or oil. In the present embodiment, water cannot be used as a working liquid used for collecting lithium sprayed waste to avoid combustion of lithium sprayed waste, and a fluorine-based solvent and oil are used. The liquid seal pump 100 is also configured by a scrubber-type pump capable of drawing gas containing lithium spray waste. For example, because it is presumed that a turbomolecular pump or a dry pump may fail when drawing gas containing solid lithium sprayed waste, it is difficult to apply a turbomolecular pump or a dry pump to the present embodiment.

The liquid seal pump 100 rotates a shaft 102 by power of the motor 101, and rotates the impeller 103. By rotating the impeller 103, lithium sprayed waste and argon gas are drawn into the pump from an intake port I, by passing through the exhaust pipe 84 and the opened valve 85 from the chamber C, and are sealed with the working liquid. The working liquid passes through the pipe 104 from an outlet J with the lithium sprayed waste and the argon gas sealed therein, and is transmitted to the tank 106.

The disposal mechanism 109 includes a filtration section 110 and an Li incinerator 107 to dispose of lithium spray waste. The filtration section 110 extracts the lithium sprayed waste by a filter or the like. The lithium sprayed waste extracted from the filtration section 110 must be disposed of so that the lithium sprayed waste does not burn due to moisture or the like.

Accordingly, the Li incinerator 107 incinerates and disposes of the extracted lithium sprayed waste. The working liquid from which the lithium sprayed waste has been removed is returned to the tank 106 through the pipe 108, and is reused as the working liquid of the liquid seal pump 100. In the collection/disposal device 83 according to the present embodiment, the lithium sprayed waste can be safely disposed of without causing combustion due to moisture or the like. Also, re-use of the heat used for the disposal and of the working liquid is enabled.

As described above, the plasma spraying device 1 according to the present embodiment is configured such that the supplying section 10 (nozzle 11) and the plasma jet P have a common axis, and that plasma spraying is performed in the enclosed region inside the chamber C. Thus, active metal having a low melting point, such as lithium, can be deposited by plasma spraying.

In addition, because the Li powder R1 is supplied to the plasma generating space U coaxially with the plasma jet P, fine particles having a particle diameter of 1 µm to 50 µm can be used as the Li powder R1. Thus, a small-sized DC power source with a low maximum electric power can be used. This reduces power consumption during plasma spraying, reduces total weight of the entire device, and reduces its footprint.

Further, in the plasma spraying device 1 according to the present embodiment, the number of steps required for pre-lithiation is reduced as compared to conventional pre-lithiation, and doping with ions of specific metal such as lithium is realized without using a difficult-to-handle solvent, and mass production of the pre-lithiation can be achieved. This allows the production of a lithium-ion rechargeable battery with increased capacity.

Although the plasma spraying device has been described in accordance with the above-described embodiments, the plasma spraying device according to the present invention is not limited to the above-described embodiments, and various modifications and enhancements can be made within the scope of the present invention. Matters described in the above-described embodiments may be combined to an extent that they are consistent.

Plasma spraying of particular metal onto an object is not limited to plasma spraying onto the substrate W, and may be applied to a rolled electrode sheet, various substrates used in an LCD (Liquid Crystal Display), an FPD (F1 at Panel Display), and the like.

This international application is based on and claims priority to Japanese Patent Application No. 2016-238707 filed on Dec. 8, 2016, the entire contents of which are incorporated herein by reference.

DESCRIPTION OF REFERENCE SYMBOLS

1: plasma spraying equipment
10: supplying section
11: nozzle
11a: flow passage
11b: opening
12: main unit
12b: recess
12d: projecting part
13: coil
14: iron core
15: yoke
20: feeder
21: container
22: actuator
30: controller
40: gas supplying section
41: gas supply source
50: DC power source
60: plasma generating section
70: chiller unit
80: stage
83: collection/disposal device
88: dry chamber
90: feeder preparation room
94: powder storage room
100: liquid seal pump
107: Li incinerator
C: chamber
U: plasma generating space

What is claimed is:

1. A method of manufacturing an electrode for a battery, the method comprising:
    injecting feedstock powder and plasma generating gas from an opening of a tip by conveying the feedstock powder with the plasma generating gas, the feedstock powder being any one of lithium (Li), aluminum (Al), copper (Cu), silver (Ag), and gold (Au), and the feedstock powder having a particle diameter of 1 µm to 50 µm;
    generating a plasma by decomposing the injected plasma generating gas using electric power of 500 W to 10 kW; and
    depositing the feedstock powder on a surface of a substrate of the electrode for the battery, by melting the feedstock powder by the generated plasma.

2. The method according to claim 1, wherein each of the injecting, the generating, and the depositing is performed in a chamber in which oxygen concentration is maintained to 10 ppm ($10^{-4}$%) or less.

3. The method according to claim 1, wherein the feedstock powder is any one of lithium (Li), aluminum (Al), copper (Cu), silver (Ag), and gold (Au), which is coated with organic or inorganic material, and a particle diameter of the feedstock powder coated with organic or inorganic material is between 1 µm and 200 µm.

4. The method according to claim 3, wherein each of the injecting, the generating, and the depositing is performed in a chamber in which oxygen concentration is maintained to 100 ppm ($10^{-3}$%) or less.

5. The method according to claim 3, wherein, by the depositing being performed, necessity of pressing the deposited feedstock and removing the organic or inorganic material is eliminated.

* * * * *